United States Patent [19]

Sellers et al.

[11] Patent Number: 5,179,607
[45] Date of Patent: Jan. 12, 1993

[54] FLUTED, HIGH EFFICIENCY FIBER OPTIC ADAPTER

[75] Inventors: Gregory J. Sellers, Naperville; Rouyentan Farhadieh, Willowbrook, both of Ill.

[73] Assignee: Forss, Inc., Naperville, Ill.

[21] Appl. No.: 731,205

[22] Filed: Jul. 15, 1991

[51] Int. Cl.⁵ .............................. G02B 6/38
[52] U.S. Cl. .................................. 385/70; 385/72
[58] Field of Search ............... 385/70, 71, 72, 77, 385/78, 81

[56] References Cited

U.S. PATENT DOCUMENTS

| | | | |
|---|---|---|---|
| 4,193,665 | 3/1980 | Arnold | 350/96.22 |
| 4,352,542 | 10/1982 | Tydings | 403/300 X |
| 4,636,034 | 1/1987 | Kashimura et al. | 385/72 |
| 4,856,866 | 8/1989 | Freeman et al. | 385/72 |

Primary Examiner—John D. Lee
Assistant Examiner—John Ngo
Attorney, Agent, or Firm—Ernest D. Buff

[57] ABSTRACT

An adapter for coupling a fiber optic connector has a terminus and a throat area provided with a fluted region. Mating connectors are aligned with the terminus by the fluted region. The adapter is injection molded as a single piece using polymeric materials and accommodates fiber optic connectors having tips in the form of right circular cylinders. The insertion force required between two connector tips during alignment is substantially reduced, minimizing damage to the fiber endfaces.

10 Claims, 17 Drawing Sheets

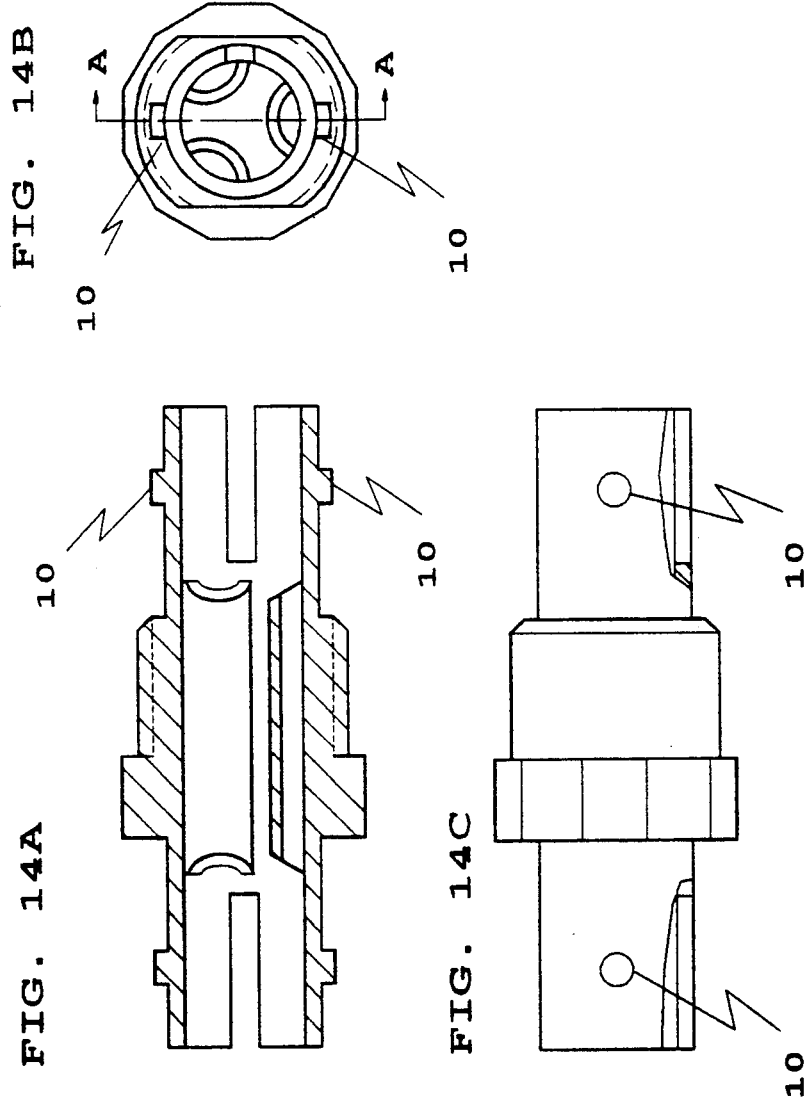

FLUTED, HIGH EFFICIENCY FIBER OPTIC ADAPTER

BACKGROUND OF THE INVENTION

1. Field of the Invention

This invention relates to the field of fiber optics and more specifically to the field of fiber optic connectors.

2. Description of the Prior Art

Fiber optic connector systems provide the means so that light can propagate through separable connections. To accomplish this, the connector system must align, hold connectors interconnect segments of fiber or connect fiber to active or passive devices. A fiber optic connector must control and minimize the loss of light energy as measured by the dB insertion loss. Many applications require insertion losses to be no more than in the range of about 1 dB. This requirement forces very stringent tolerances on the mechanical components of the connector system.

The prior art shows many connector designs. These include V-groove, three-rod containment, resilient ferrule, elastomeric bushing, jewel bushing, conical nose/-conical adapter, and precision ferrule/precision adapter devices. In the ferrule types of connectors, a ferrule terminates the end of each optical fiber. For example, U.S. Pat. No. 4,645,296 discloses a resilient ferrule connector. U.S. Pat. No. 4,934,785 discloses a precision ferrule connector.

Currently, the major commercial connectors employ ferrules. These include the SMA, ST and FC connectors where each ferrule is a right cylinder. These also include the Biconic connector where the ferrule is a truncated cone. Ferrule-terminated fibers require an alignment means to provide precise positioning of the fiber ends. In one design, an elastomeric sleeve aligns the front portions, termini, of the mating ferrules. In another design, a split spring sleeve aligns oppositely facing ferrules. In these designs, the ferrule diameter is slightly larger than the free-standing diameter of the alignment means. This insures interference for the precise alignment of the two mating ferrules. In yet another design, a precise bore provides a cylindrical channel for alignment.

In these major commercial connector systems, a separate, stand-alone component provides the alignment means. This component has several different names including adapter, alignment sleeve, coupling bushing and coupler.

The functions of fiber optic adapters are to secure, position and align mating pairs of connectors thereby supporting reliable circuits. In the major commercial connector systems, adapters use cylindrical (or conical) geometries to achieve the critical positioning of the mating fiber optic connectors. Adapters require precise mechanical tolerances. The techniques to achieve these tolerances are both difficult and expensive. The details of the adapter design depends on the specific connector type.

The adapter should permit multiple connect-disconnect cycles without damage to the connector system components. In addition, the insertion loss values should be roughly constant when mated throughout the connect-disconnect cycles.

Most adapters can secure the fiber optic connectors to prevent their accidental removal when the connectors experience forces or tensions. Several means are in common use. The most popular of these include threaded nut and bayonet nut.

Some adapters attach to a bulkhead. Some adapters have an exterior thread and use a pair of opposed nuts to secure the adapter to a bulkhead. Alternatively, some adapters use a nut pressing against a fixed land on the adapter body. Other adapters provide tapped holes to receive bolts through the bulkhead.

U.S. Pat. No. 4,186,997 and U.S. Pat. No. 4,526,431 disclose additional adapters.

At present, a popular connector for fiber optic systems is the SMA connector. (SMA is the registered trademark of Amphenol Corporation.) This connector is the basis for a military specification, MIL-C-83522. In that specification, the adapter is shown as a machined part made from steel. That specification requires tolerances as tight as 0.0003 inch. Maintaining such tight tolerances on machined metal parts has resulted in expensive parts that are difficult to manufacture. Even with such tight tolerances, adequate performance with the most popular fiber sizes requires the introduction of an additional part. This additional part is a plastic sleeve having the form of a right circular tube. The combination of a machined metal part and a plastic sleeve creates practical adapters. These adapters succeed in interconnecting the most popular fiber types, including 50/125, 62.5/125 and 100/140 (the numbers referring to the core and fiber diameters in microns).

Another connector for fiber optic systems is the FC connector. This connector satisfies selected telecommunication applications. It also finds applications with single mode optical fiber where the smaller core size of about 8 microns demands even more stringent dimensional tolerances. With this FC system, the adapter consists of several metal pieces and a very critical ceramic sleeve. The ceramic sleeve, a split-ring right circular tube, requires tight tolerances, on the order of microns. The ceramic sleeve with its tight tolerances assures the required positioning and alignment of the connector tips. The additional metal pieces protect the ceramic sleeve and secure the connectors. This ceramic sleeve has been a very difficult part to manufacture. Only a few vendors in the world now own the required technology. Hence, the sleeve continues to be a very costly part.

Yet another connector for fiber optic systems is the ST connector. (ST is a trademark of AT&T Corporation.) This connector finds application primarily with multimode fibers but may have the potential to satisfy additional applications with single mode fiber. This connector system includes more than one type of adapter. In one ST adapter design, metal parts capture a split alignment sleeve. Maintaining the required manufacturing operations has led to difficulties and costly parts. In another ST adapter design, plastic molded parts capture a ceramic sleeve. Again, the manufacture of the ceramic sleeve with its required precise tolerances has led to production limitations and difficulties as well as expensive parts.

SUMMARY OF THE INVENTION

Briefly stated, the invention provides a one-piece adapter for fiber optic connectors. This adapter is economical to manufacture, easy to connect and disconnect and highly reliable in operation.

The adapter has a fluted region within its throat area to align the front portions, termini, of the fiber optic connectors. Adapters of this invention support the most popular fiber optic connector systems including SMA, ST, FC and the like. During coupling, the termini of the mating connectors ride along the innermost surfaces of flutes inside the adapter. These fluted surfaces align the connector termini via a slight interference fit. The designs of the fluted cross sections permit low insertion forces for the terminus into the adapter. The invention provides stresses and strains which are reasonable within the adapter body and its fluted regions during coupling. The adapter body is a single component that is injection molded using polymeric materials.

The adapter of this invention is one piece; prior adapters for the same connector systems required multiple pieces. This adapter can be injection molded from specified polymeric materials which exhibit strength, resilience, creep resistance and temperature stability. As contrasted with the earlier multi-step manufacturing processes for previous adapters, the single-step injection molding process provides less expensive manufacturing and part costs.

BRIEF DESCRIPTION OF THE DRAWINGS

The invention will be more fully understood and further advantages will become apparent when reference is had to the following detailed descriptions of the preferred embodiments of the invention and the accompanying drawing which:

FIG. 14 depicts a complete ST adapter;

DESCRIPTION OF THE PREFERRED EMBODIMENTS

Figure 1:
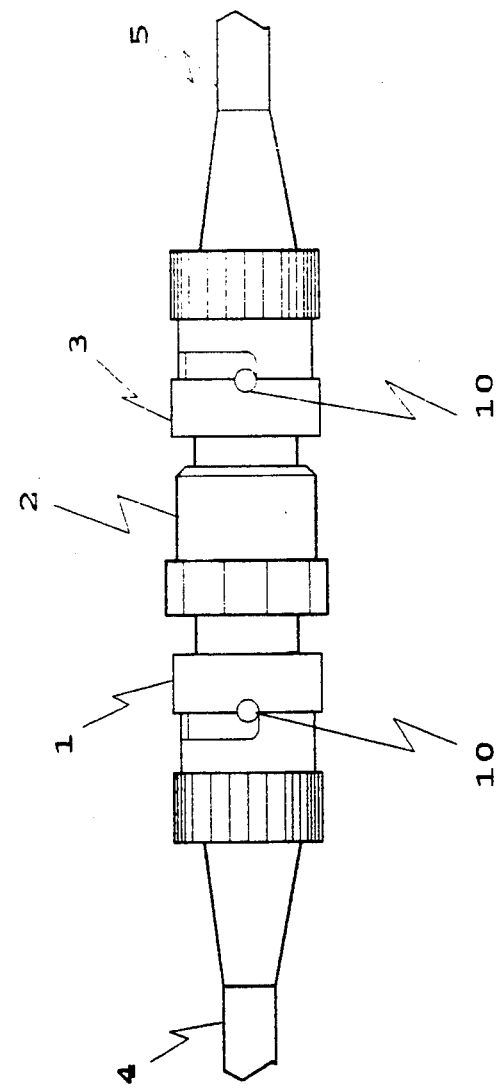
FIG. 1 is an assembly drawing of a pair of fiber optic connectors which connect through an adapter.
Figure 2:
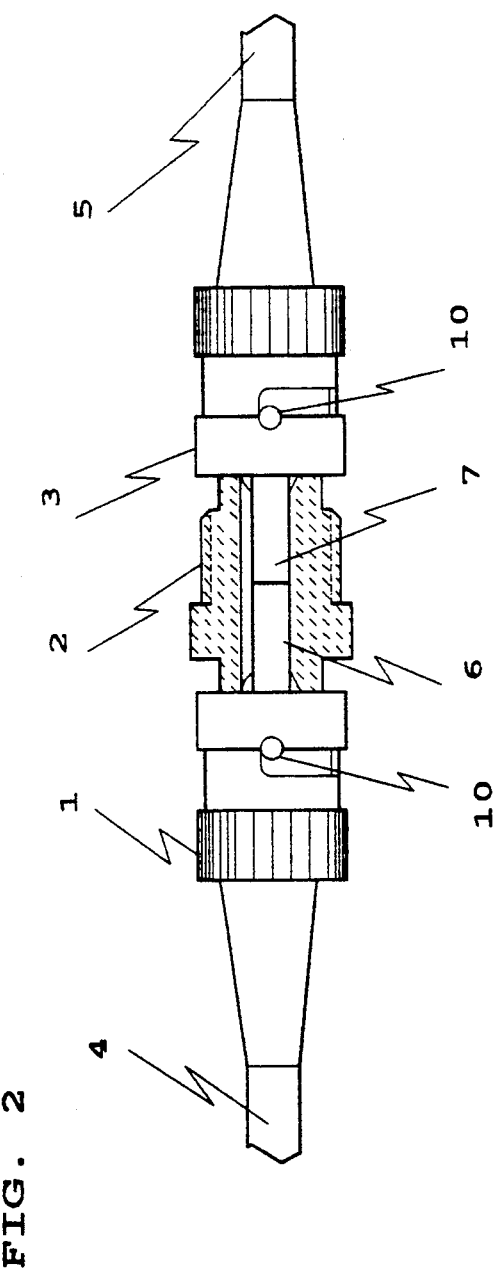
FIG. 2 is a cross-sectional view of FIG. 1.

Referring to the drawings, FIGS. 1 and 2 show a fiber optic connector system. This system consists of two fiber optic connectors mated by an adapter. Adapter 2 aligns connector 1 and connector 3. Specifically, as shown in FIG. 2, adapter 2 serves to position the front portion, terminus, 6 of connector 1. Simultaneously, adapter 2 also positions the terminus 7 of connector 3. As illustrated, the mating pair of connectors are members of the ST connector system.

Figure 3:
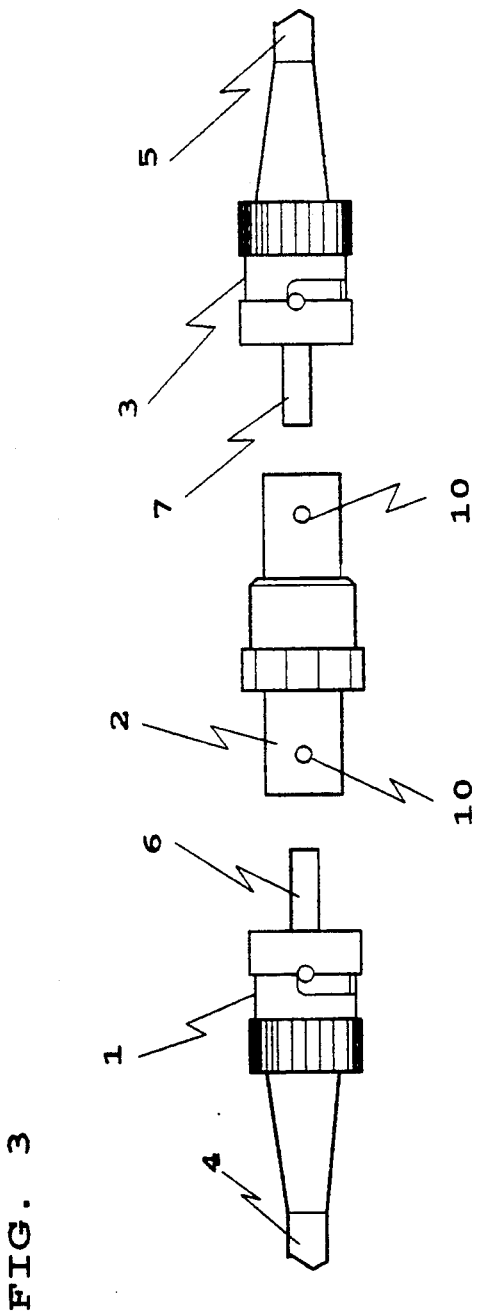
FIG. 3 gives an exploded view of FIG. 1.

FIG. 3 shows an exploded view of the connectors and the adapter clarifying the assembly views shown in FIGS. 1 and 2.

Fiber optic connector 1 terminates fiber optic cable 4; fiber optic connector 3 terminates fiber optic cable 5. Normal practice requires the testing of these terminations before use with adapter 2. For successful operation, the interconnection must permit light to travel through the optical circuit. Specifically, this interconnection must allow light to travel from cable 4 through connector 1, through the adapter 2, through connector 3, and finally into cable 5. In addition, the interconnection must enable light to transverse the same path in the opposite direction.

Figure 4B:
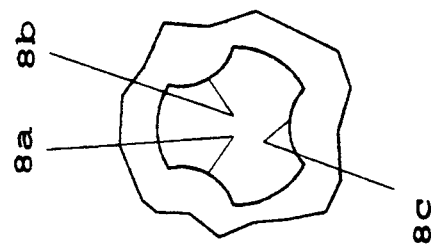
FIG. 4 is a detailed view of the fluted region within the adapter of FIG. 1.
Figure 4A:
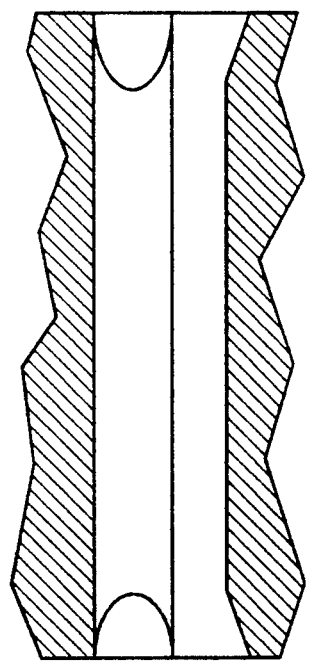

The adapter of the present invention uses a fluted region to align the mating connectors. FIG. 4 shows this fluted region of the adapter. The termini of the mating connectors 6 and 7 ride along the innermost surfaces of flutes $8a$, $8b$ and $8c$ inside the adapter 2. These fluted surfaces align the connectors and permit achievement of a low insertion loss. The designs of the fluted cross sections enable (1) the insertion of the terminus into the fluted region with appropriate forces, (2) reasonable and appropriate stresses and strains within the materials which create the adapter and its fluted region, and (3) the use of polymeric materials.

The adapters of this invention align ferrules whose termini are in the shape of circular cylinders. Each terminus contacts the innermost points on the flutes when inserted. The design insures a slight interference fit between the terminus and the innermost points on the flutes.

The adapter can have 2 or more flutes. Two flutes require some means on their innermost surfaces to capture the fiber optic connector. Three flutes are the preferred number. Four or more flutes result in an overspecified condition and in less than optimum alignment.

Figure 5B:
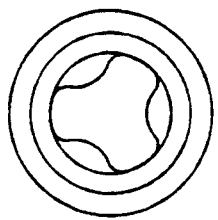
FIG. 5 depicts an adapter having 3 flutes.
Figure 5A:
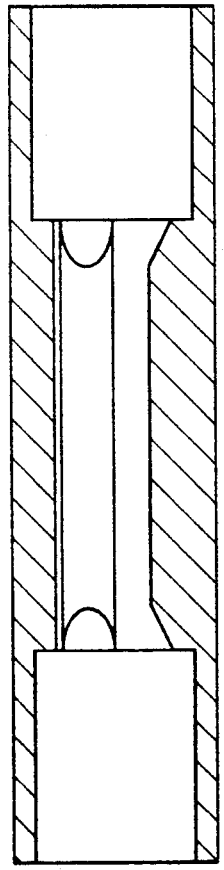
Figure 5C:
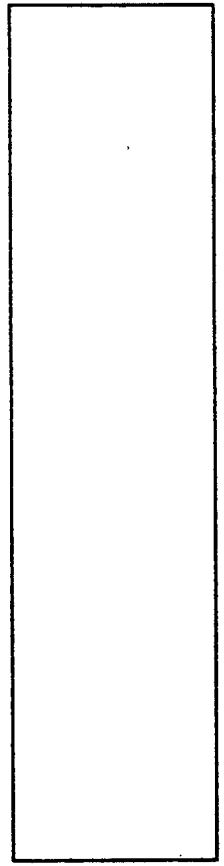

Three flutes produce optimum alignment because of geometric considerations. FIG. 5 shows an adapter having 3 flutes. The innermost surfaces of the flutes define a critical region. By design, the diameter of this critical region is slightly smaller than the connector termini. Thus, an inserted pair of cylindrical termini contacts the innermost surfaces of the flutes. The three flutes position the termini so their axes are coincident. This produces an optimum alignment condition.

Adapter designs could locate the flutes with irregular spacing around the central hole of the adapter. The preferred design places the flutes with equal spacing so 120 degrees separate each flute from the others. Equal spacing of the flutes assures that each flute shares equally in the forces generated by the intentional design interferences. Such equal sharing of forces helps to maintain the center of the connector cylinder on the adapter axis. This helps to maintain the overall alignment of the fiber optic interconnection. This invention includes flutes with different shapes. FIG. 6 shows cross sections through several of these shapes.

Figure 6A:
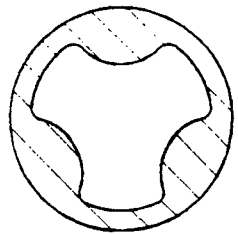
FIG. 6A-6H depict examples of several fluted shapes.

FIG. 6A shows an adapter having three flutes. The cross section of each flute is substantially circular in the region of contact with the terminus.

Figure 6B:
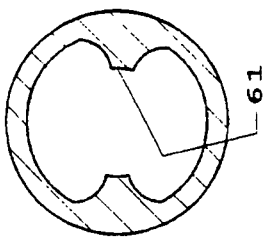

FIG. 6B depicts an adapter having two flutes. Each flute has a concave region 61 designed to contact the terminus of the fiber optic connector.

Figure 6C:
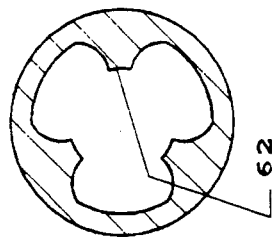

FIG. 6C shows an adapter having three flutes. Each flute has a concave region 62 designed to contact the terminus of the fiber optic connector.

Figure 6D:
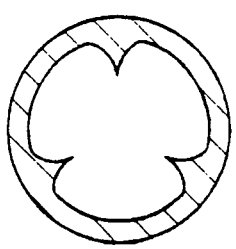

FIG. 6D shows an adapter having three flutes. The cross section of each flute is substantially triangular in the region of contact with the terminus.

Figure 6E:
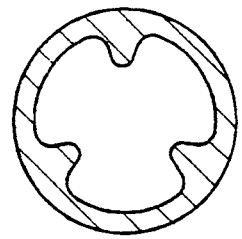
Figure 6F:
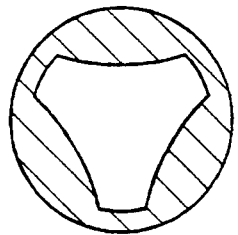

FIGS. 6E and 6F illustrate adapters having three flutes with a preferred shape. The cross section of each flute is convex in the region of contact with the terminus. The flute of FIG. 6F has a larger radius than the flute of FIG. 6E.

Figure 6G:
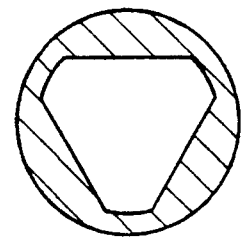

FIG. 6G shows an adapter having three flutes. The cross section of each flute is substantially planar in the region of contact with the terminus.

Figure 6H:
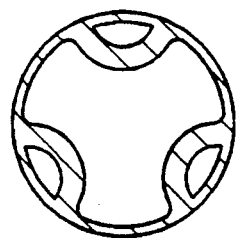

FIG. 6H shows a preferred fluted arrangement. The adapter has three flutes which are convex in the region of contact. Each flute is a curved beam supported at both ends and acts as a leaf spring.

These fluted shapes would be difficult to produce if machined from a solid. The adoption of injection molding eliminates such machining operations. Accordingly, injection molding is the preferred method of production. The core pin of the mold provides the required shapes in the molded parts. A single mold using a single core pin produces many parts sequentially. Injection molding processes that use multi-cavity molds, automatic operation and the like further reduce production costs.

The force required to insert the terminus into the adapter must be of a reasonable magnitude. Specifically, the insertion force should not be excessive. Prior adapters equipped with plastic sleeves have often times i suffered from insertion forces which were excessively high. Ideally, the insertion force should range from a few ounces to a few pounds. The magnitude of the insertion force depends on the coefficient of friction and the normal force between the adapter and the terminus. The coefficient of friction depends on the materials used and on their surface preparation. The normal force depends on the materials used and on the amount of interference between the terminus and the adapter.

Design values and their tolerances must maintain adequate interference even with the least favorable conditions. This interference insures that the adapter aligns the termini of the mating connectors. The interference generates deflections or compressions with the interconnection. The overall design deflection must be large enough to insure adequate interference even with stacked tolerances. In effect, this creates the required minimum deflection for stated tolerances.

These deflections contribute to normal forces against the terminus. For a given material and geometry, a larger deflection generates a larger restoring stress in the deflected material. This larger restoring stress generates a larger normal force.

Connectors with a cylindrical terminus encounter an additional factor. The area of contact contributes directly in determining the total normal force. This area of contact is the area of the adapter that meets with the terminus of the connector.

The area of contact is a function of connector design. For a simple circular tube connector, the area is the product of the circumference and the penetration length. For the present adapter, the area is the product of the flute width which contacts the terminus and the penetration length. The area of contact of the present adapter is a small fraction of the area of the prior adapter. The flutes permit greater control of the contacting area and thus of the normal force. For a given material, this results in greater control of the total required insertion force. Specifically, the flutes permit a lowering of the total insertion force while still permitting the required condition of interference for alignment.

As mentioned hereinabove, an advantage of the present adapter is its ability to use polymeric materials. This permits the use of injection molding in its manufacture. The polymeric material must provide the required shapes, tight tolerances and smooth surfaces. The stress-strain curve of the material should permit the part to remain in the elastic region even when fully deflected. Such material should exhibit an elastic region of at least 1 to 2%. The modulus of the polymeric material is a key factor in determining the insertion force. The material should have a reasonable coefficient of friction. The material should exhibit sufficient thermal capability to allow it to perform over the range of temperatures required by fiber optic applications. The material should provide adequate creep resistance to insure stable geometry even when the part experiences maximum deflection for long times.

Several engineering resins have desirable properties which would appear to satisfy these requirements. The preferred candidate is a liquid crystal polymer. The liquid crystal resins possess outstanding balances of properties including high temperature capability, excellent resistance to creep, excellent ability to mold, high modulus and acceptable elongation. Vectra A130 liquid crystal resin, manufactured by Hoechst Celanese, is a preferred material for this application.

The adapter of the present invention is created as a single piece by injection molding. The most critical tolerances are in the region of the innermost surfaces of the flutes. The injection molding process creates these surfaces when the resin is forced into the mold cavity and comes into contact with the central core pin. Careful construction of this core pin insures that the required shape, dimensions and tolerances transfer to the plastic molded part.

Adapters constructed according to this invention have lower tolerance requirements than adapters of the split ceramic tube variety, making them moldable at lower cost. The fluted construction facilitates connecting-disconnecting operations and enhances the stability of the connector. The adapter construction is amenable to use with engineering resins such as liquid crystal polymers having high temperature capability, excellent creep resistance, excellent ability to mold, high modulus and acceptable elongation. This combination of properties affords production of an adapter having extended temperature range and stability. Economics of manufacture are realized, since the adapter can be injection molded as the fluted injection moldable adapter. A one piece design is compatible with a wide variety of popular connector types and can be adapted to accommodate multichannel interconnects.

In addition, the design of the adapter can cooperate with receptacles for light sources and detectors. For numerous applications, a fiber optic connector mates to a light source at the transmitting end and a detector at the receiving end. Such interconnections requires the use of a component called a receptacle. The receptacle optimally aligns the connector terminus with the source or the detector.

The following examples are presented to provide a more complete understanding of the invention. The specific techniques, conditions, materials, proportions and reported data set forth to illustrate the principles of the invention are exemplary and should not be construed as limiting the scope of the invention.

EXAMPLE 1

Example 1 provides a mathematical model of the SMA connector system to analyze the application and benefits of the invention. This analysis quantifies the relationships among the following factors: insertion force, normal force, contact area, contact stress and design deflection.

In this example, the adapter contains three flutes. The cross section of each flute is circular in the region of contact with the connector terminus. The connector has the dimensions and shape associated with the SMA fiber optic connector. The terminus of the SMA connector is a ceramic ferrule. The polymeric material for the adapter is liquid crystal polymer, Vectra A130, supplied by Hoechst Celanese.

Figure 7:
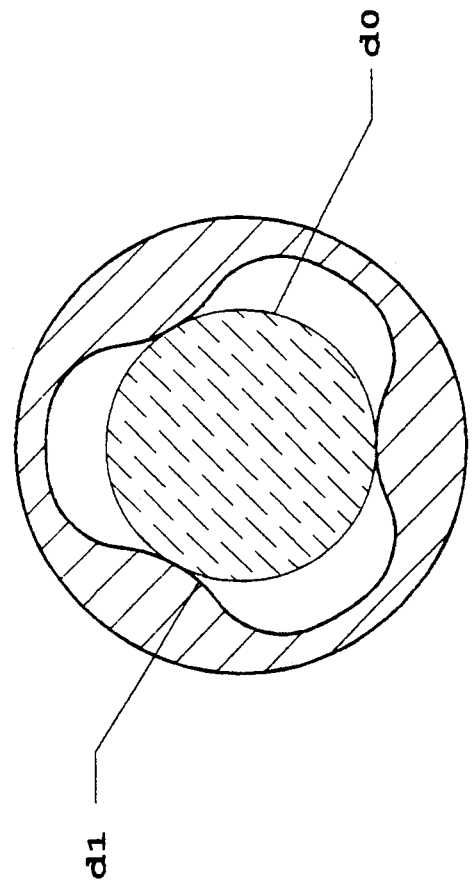
FIG. 7 shows the cross section of the critical region of the SMA adapter with an inserted connector.

FIG. 7 presents a cross section showing the contact between the adapter and an inserted connector. The terminus of the connector is slightly larger than the free-standing internal region of the flutes. Upon insertion, an interference occurs between each of the flutes and the terminus of the connector.

The following calculations deal with the SMA adapter-connector described above. Other mathematical models can be developed for other adapter-connector configurations within the scope of the invention.

The terminus of an SMA fiber optic connector is rigidly connected to the rest of the SMA connector. As a result, the insertion force is not restricted to a narrow range. For convenience, the insertion force should be in the range of about one pound to about ten pounds.

Equation 1 shows the relation between the insertion force and the normal force.

$$F = n\mu N \qquad \text{Equation (1)}$$

In this equation, the terms have the following definitions.

F is the insertion force.
n is the number of flutes.
$\mu$ is the coefficient of friction.
N is the normal force between one flute and the terminus of the connector.

For calculation, the number of flutes is 3. The value for the static coefficient of friction of the liquid crystal polymer against metal is 0.19. To allow for friction against ceramic and to provide margin for surface roughness, the coefficient of friction is set at the more conservative value of 0.33. Based on these parameters, a desirable insertion force of about 2.0 lbs corresponds to a normal force of about 2.0 lbs.

Figure 8:
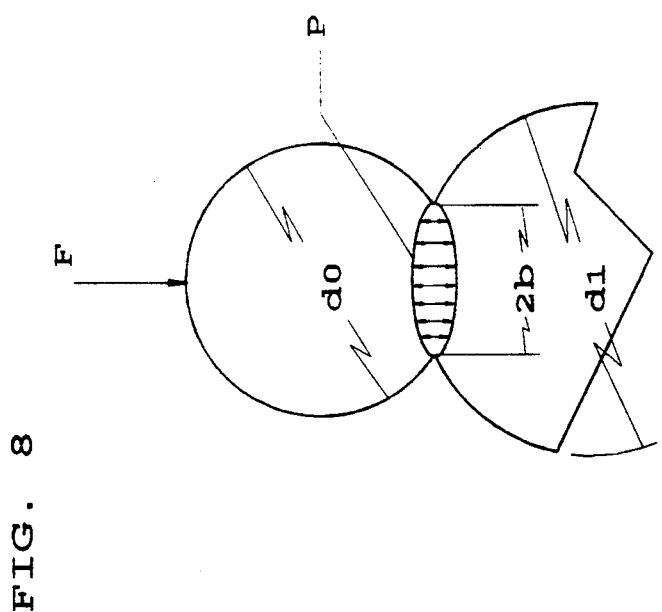
FIG. 8 illustrates the details of interaction between a single flute in the SMA adapter and the connector.

Both the fluted surface and the terminus of the connector have curved surfaces. When these surfaces press together, they deform and develop an area of contact. The deformation generates compressive stresses. FIG. 8 illustrates this interference and indicates the area of contact. This area of contact approximates a rectangle at each flute. Equation 2 calculates the half width of this rectangle of contact.

$$b = \sqrt{\frac{2N}{\pi L} \frac{(1 - \mu_p^2)\left(\frac{1}{E_1} + \frac{1}{E_0}\right)}{\left(\frac{1}{d_0} + \frac{1}{d_1}\right)}} \qquad \text{Equation (2)}$$

In this equation, the terms have the following definitions.

b is the half width of the contact area between one adapter flute and the connector terminus.
N is the normal force between one flute and the terminus.
$d_o$ is the diameter of the terminus of the connector.
$d_1$ is the diameter of the flute in the region of contact with the terminus.
L is the penetration length of the terminus into the fluted region of the adapter.
$\mu_p$ is the Poisson ratio of the plastic.
$E_o$ is the modulus of elasticity of the terminus of the connector.
$E_1$ is the modulus of elasticity of the fluted adapter.

Values for the above parameters include the following. The normal force, N, is 2.0 lbs as calculated from Equation 1. The diameter of the terminus of the connector, $d_0$, is 0.085 inch. The diameter of the flute in the region of contact with the terminus, $d_i$, is $-0.24$ inch. This minus sign indicates a concave surface. The penetration length of the terminus into the fluted region of the adapter, L, is 0.125 inch. The Poisson ratio, $\mu_p$, (derived from other plastics) is 0.34. The modulus of elasticity of the terminus, $E_0$, (from the International Critical Table) is $50 \times 10^{+6}$ psi. The compressive modulus for A130 liquid crystal polymer, $E_1$, is $1.7 \times 10^{+6}$ psi. Based on these values, Equation 2 determines a value of $0.85 \times 10^{-3}$ inch for the half width of contact, b.

Equation 3 provides the total contact area per flute, A. Equation 3 determines a contact area of $2.1 \times 10^{-4}$ square inch between the terminus of one connector and the surface of one flute.

$$A = 2 b L \qquad \text{Equation (3)}$$

For analysis, a mathematical model treats the adapter-connector as two cylinders pressed together. This model permits an estimate of the contact stress in the plastic. For these two cylindrical surfaces, the contact pressure has an elliptical distribution across the width 2b of the rectangle of contact. Equation 4 relates the maximum compressive stress in the material, P, to the normal force N and contact dimensions.

$$P = \frac{2N}{\pi b L} \qquad \text{Equation (4)}$$

Based on the values of normal force and contact area generated heretofore, Equation 4 determines a maximum compressive stress of 12,000 psi. This value is within the creep capabilities of Vectra A130 at room temperature.

The actual interference between the terminus and the flute of the adapter generates a complex pattern of stresses and strains within the assembly. For analysis, a simplified model replaces the actual pattern. The model assumes that the total interference $L_T$ is the sum of two contributing terms. This simplified model permits the determination of numerical relationships between the contact stress and the interference. Equation 5 defines this relationship.

$$L_T = L_1 + L_2 \qquad \text{Equation (5)}$$

In this equation, the terms have the following definitions.

$L_T$ is the combined interference between the terminus of the connector and the fluted surface of the adapter.

$L_1$ is the compression of an assumed one-dimensional column.

$L_2$ is the expansion of the adapter hoop radius.

Figure 9A:
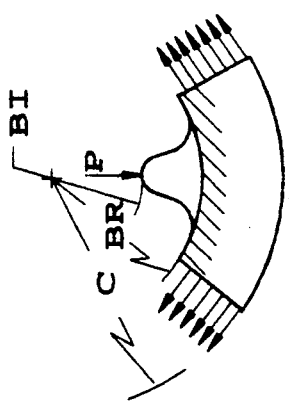
FIG. 9 illustrates diagrammatically a simplified model for interferences for the SMA adapter.
Figure 9B:
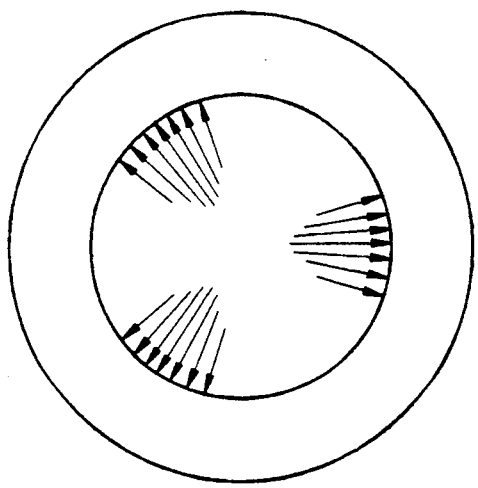

The first term $L_1$ treats the complex interactions within each flute as a simple one-dimensional compression of a column. The second term $L_2$ allows for an overall expansion of the adapter. This radial expansion occurs at the point where the columns of $L_2$ rest. FIG. 9 diagrams the interaction which connect the interferences with the contact stresses.

Equation 6 defines the term $L_1$.

$$L_1 = \frac{P}{E_1} (B_R - B_I) \qquad \text{Equation (6)}$$

In this equation, the terms have the following definitions.

$L_1$ is the compression of the column due to the applied stress.

P is the contact stress at the interface between the terminus of the connector and the fluted surface on the adapter.

$E_1$ is the modulus of elasticity of the plastic.

$B_R$ is the radius to the root of each flute from the center of the adapter.

$B_r$ is the radius to the innermost point of each flute from the center of the adapter.

Equation 7 presents a very simplified equation for $L_2$.

$$L_2 = \frac{B_R P'}{E_1} \left( \frac{(C)^2 + (B_R)^2}{(C)^2 - (B_R)^2} + \mu_p \right) \qquad \text{Equation (7)}$$

In this equation, the terms have the following definitions.

$L_2$ is the increase in radius of the adapter at the root of the flutes.

P' is the averaged contact pressure at the root of each flute.

$E_1$ is the modulus of elasticity of the adapter.

$B_R$ is the radius to the root of each flute from the center of the adapter.

C is the radius to the outside of the adapter from the center of the adapter.

$\mu_p$ is the Poisson ratio for the plastic.

Equation 8 relates P' to the normal force and geometric factors.

$$P' = \frac{nN}{2\pi L B_R} \qquad \text{Equation (8)}$$

In this equation, the terms have the following definitions.

P' is the averaged contact pressure at the root of each flute.

n is the number of flutes.

N is the normal force between one flute and the terminus.

L is the penetration length of the terminus into the fluted region of the adapter.

$B_R$ is the radius to the root of each flute from the center of the adapter.

Based on realistic values, these equations provide estimates of the interferences. Realistic parameter values include the following. The number of flutes, n, is 3. The normal force, N, is 2.0 lbs. The penetration length of the terminus into the fluted region of the adapter, L, is 0.125 inch. The radius to the root of each flute, $B_R$, is 0.100 inch. The modulus of elasticity for the A130 liquid crystal plastic, $E_1$, is $1.7 \times 10^{+6}$ psi. The radius to he outside of the adapter, C, is 0.125 inch. The Poisson ration, $\mu_p$, is 0.34. The maximum contact stress, P, is 12,000 psi. The radius to the innermost point of each flute, $B_I$, is 0.042 inch. Based on these values, Equation 8 determines a P' value of 76 psi. Equation 7 determines an $L_2$ value of $2.2 \times 10^{-5}$ inch. Equation 6 determines an $L_1$ value of $0.41 \times 10^{-3}$ inch. Equation 5 determines an $L_T$ value of $0.43 \times 10^{-3}$ inch.

The advantages afforded by the fluted adapter of the invention become clear when compared with prior adapter designs. Prior SMA adapters include a right cylindrical tube to provide alignment. The advantages of the invention can be viewed from several distinct perspectives. In comparing current and prior designs, three factors are of primary importance: material selection, As viewed from one perspective, this invention offers the following advantage. For the same materials and the same interferences, the current invention provides much lower insertion forces. This originates from the much smaller contact area for the fluted design compared with the full cylindrical tube. For the interferences stated earlier in Example 1, the fluted design produces desirable insertion forces. For these same interference and materials, the prior design with its tube would provide unacceptably high insertion forces.

As viewed from a second perspective, this invention offers the following advantage. For the same materials and the same insertion force, the current invention permits much larger interferences. In turn, these larger interferences permit a relaxation in the tolerances required for the current adapter. This permits easier manufacturing and less costly parts.

As viewed from a third perspective, this invention offers the following advantage. For the same interferences and the same insertion forces, the current invention permits the use of more desirable materials for the construction of the adapter. This invention permits the use of injection molding and liquid crystal resin to produce a one-piece adapter.

EXAMPLE 2

Example 2 provides a mathematical model for the ST connector system to analyze the application and benefits of this invention. This analysis quantifies the relationships among the following quantities: insertion force, normal force, contact area, contact stress and design deflection. This example will draw on some aspects of the analysis presented earlier in Example 1.

This ST adapter contains three flutes. The cross section of each flute is circular in the region of contact with the connector terminus. Each flute is a curved beam supported at both ends and acts as a leaf spring. The terminus of the ST connector is a ceramic ferrule. The polymeric material for the adapter is a liquid crystal polymer, Vectra A130, supplied by Hoechst Celanese.

Figure 10:
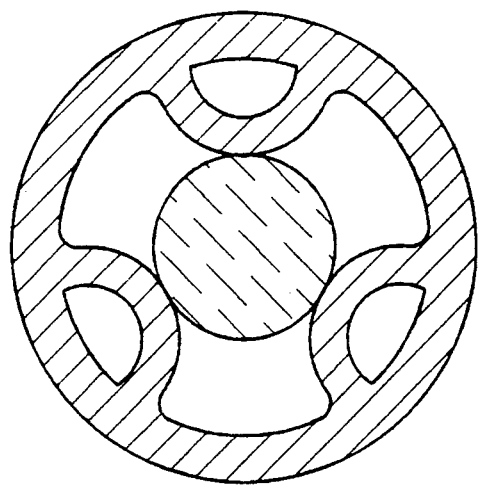
FIG. 10 is a sectional view of the critical region of an inserted connector.

FIG. 10 presents a cross section showing the contact between the adapter and an inserted connector. The terminus of the connector is slightly larger than the free-standing internal region of the flutes. Upon insertion, an interference occurs between each flute and The following calculations apply to the ST adapter-connector described above. Other mathematical models can readily be developed for other configurations within the scope of the invention.

The terminus of an ST fiber optic connector is spring loaded. This spring provides a force of about 2 lbs to push the terminus into the adapter. Therefore, a desirable insertion force is in the range of about 1 lb.

As detailed earlier, Equation 1 provides the relationship between the insertion force and the normal force. For calculation, the number of flutes is 3. The lo value for the coefficient of friction is set at 0.33. Based on these parameters, the desired insertion force of about 1 lb corresponds to a normal force of about 1 lb.

Figure 11:
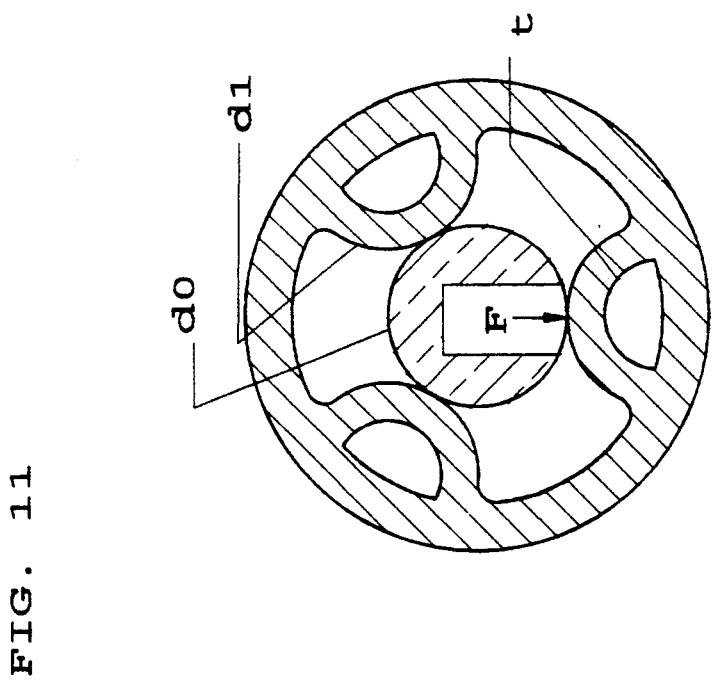
FIG. 11 illustrates details of interaction between a single flute in the ST adapter and the connector.

Both the fluted surface and the terminus of the s together, they deform and generate an area of contact. FIG. 11 illustrates these contacting surfaces. Following the analysis presented in Example 1, Equations 2 and 3 can provide this contact area.

Values used in the calculations include the following. The normal force, N, (as calculated hereinabove) is 1 lb. The diameter of the terminus of the connector, $d_o$, is 0.0984 inch. The diameter of the flute in the region of contact with the terminus, $d_1$, is 0.16 inch. The penetration length of the terminus into the fluted region of the adapter, L, is 0.234 inch. The Poisson ratio, $\mu_p$, (derived from other plastics) is 0.34. The modulus of elasticity of the terminus, $E_o$, (from the International Critical Table) is $50 \times 10^{+6}$ psi. The compressive modulus, $E_1$, for A130 liquid crystal polymer is $1.7 \times 10^{+6}$ psi. Based on these values, Equation 2 determines a half width of contact, b, of $0.30 \times 10^{-3}$ inch. Equation 3 indicates a contact area of $1.4 \times 10^{-4}$ square inches between the terminus of one connector and the surface of one flute.

For analysis, a mathematical model treats the ST adapter-connector as two cylinders pressed together. This model permits an estimate of the contact stress in the plastic. Based on the values assigned hereinabove, Equation 4 indicates a maximum compressive stress of about 9100 psi. This value is well within the creep capabilities of Vectra A130 at room temperature.

Figure 12B:
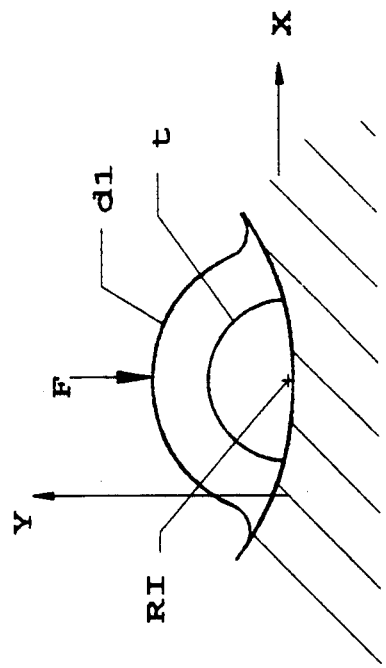
FIG. 12 illustrates diagrammatically a simplified model of interferences for the ST adapter.
Figure 12A:
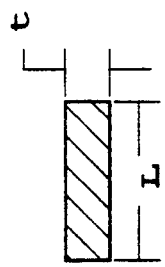

The actual interference between the terminus of the connector and the flute of the adapter generates a complex pattern of stresses and strains. A mathematical model permits the determination of numerical relationships between the contact stress and the interference. FIG. 12 diagrams the model. In this model, each flute in the ST adapter acts as an arched leaf spring. The normal force deflects the leaf spring by acting on its midpoint. Equation 9 gives the deflection of the leaf spring.

$$L_T = \frac{NL_B^3}{48E_F I} \qquad \text{Equation (9)}$$

In this equation, the terms have the following definitions.

$L_T$ is the deflection of one flute in the adapter with the terminus of the connector.

N is the normal force between one flute and the terminus of one connector.

$L_B$ is the arc length of the curved beam.

$E_F$ is the flexural modulus of the plastic.

I is the moment of inertia of the leaf spring.

Equation 10 defines the moment of inertia of the leaf spring.

$$I = \frac{t^3 L}{12} \qquad \text{Equation (10)}$$

In this equation, the terms have the following definitions.

I is the moment of inertia of the leaf spring.

t is the thickness of the material in the leaf spring.

L is the penetration length of the terminus into the fluted region of the adapter.

Values assigned to the above parameters include the following. The number of flutes, n, is 3. The normal force, N, is 1 lb. The penetration length of the terminus into the fluted region of the adapter, L, is 0.234 inch. The radius of the leaf spring, R', is 0.080 inch. The arc length of the curved beam, $L_B$, is 0.166 inch. The flexural modulus for the A130 liquid crystal resin, $E_F$, is $2.1 \times 10^{+6}$ psi. The thickness of the material of the leaf spring, t, is 0.018. Based on these values, Equation 10 determines a value of $1.14 \times 10^{-7}$ inch$^4$ for the moment of inertia, I. Equation 9 determines an $L_T$ value of $0.4 \times 10^{-3}$ inch.

Each flute experiences a deflection of $0.4 \times 10^{-3}$ inch upon insertion of the terminus into the adapter. This generates a normal force of about 1 lb.

The advantages of the fluted adapter of the invention become clear when compared with prior ST adapters. The prior designs used either a simple right circular tube or a split sleeve arrangement for the adapter. Therefore, these earlier designs had a much larger area of contact. In comparing current and prior designs, three factors are of primary importance: material selection, interference and insertion force. The current invention provides desirable insertion forces with relaxed tolerances or with easier manufacturing processes than prior adapters.

EXAMPLE 3

Figure 13B:
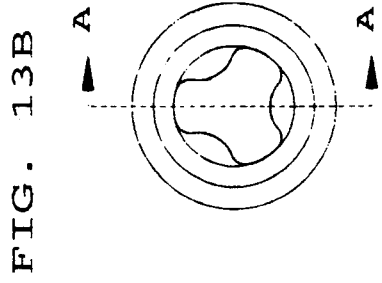
FIG. 13 shows a complete bare adapter.
Figure 13A:
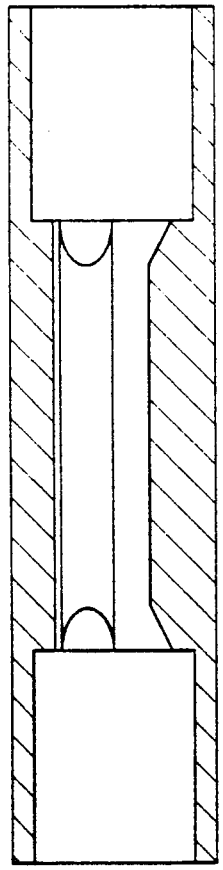
Figure 13C:
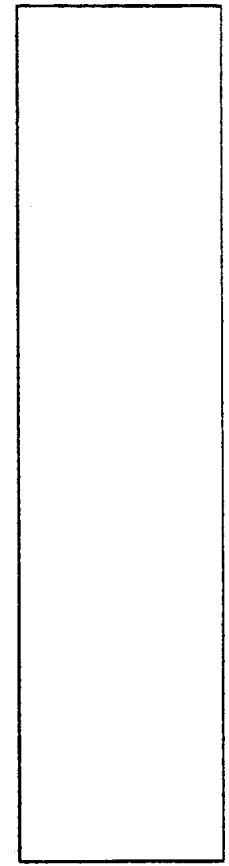

FIG. 13 shows an adapter constructed according to this invention. This adapter has three flutes and does not contain connector retention means. The adapter can comprise part of a larger assembly. For example, it can be part of a hybrid connector.

EXAMPLE 4

FIG. 14 shows a complete ST adapter incorporating the elements of the present invention. The adapter has a three-fluted configuration and a connector retention means 10.

EXAMPLE 5

Example 5 describes the fabrication of ST adapters and provides test data. These ST adapters use the design presented in Example 4. These ST adapters have three flutes which act as leaf springs.

To produce these adapters, a single cavity mold is designed and constructed. This mold uses parting line injection with gates through the bayonet studs. The central core pin in this mold is a single piece through the critical region. This central core pin is polished to insure that the critical innermost fluted surfaces are smooth and capable of providing excellent alignment.

This mold is mounted and run in a 28 ton Arburg Injection Molding Machine. The design, construction and operation of molds are well known to those skilled in the art.

Parts are molded using Vectra A130 liquid crystal polymer resin as supplied by Hoechst Celanese. The injection molding parameters are within the range recommended by the resin supplier. They include the following. The injection pressure is 1100 psi. The holding pressure is 800 psi. The mold temperature is 150 degrees F. The melt temperature is 520, 550 and 550 degrees F in the three stages of the molding press. The nozzle temperature is 540 degrees F.

Adapters of this invention are successfully molded with all required features including the three internal flutes. The molded flutes, which act as leaf springs, are capable of the required deflections to assure interference and good alignment. The insertion forces for ST termini are acceptable. The molded adapters are capable of accepting, holding and retaining commercially available ST connectors. The molded ST adapters show good surface appearance and are capable of maintaining the required tolerances Optical insertion loss measurements compare the adapter of this invention with prior adapters. The test method permits quantitative measurements of the relative performance of the current adapter with commercially available adapters of prior designs. For these tests, a light source is connected to a fiber optic cable. This cable has ST connectors on both ends. This cable is connected to the ST adapter under test. In turn, the test adapter is connected to a second fiber optic cable that is also terminated with ST connectors. Finally, this second cable is connected to a light detector. Test equipment used in the measurements include the following. The light source is a light emitting diode operating at 850 nanometer, Model FOS-121-32, manufactured by EXFO. The light detector is a fiber optic powermeter, Model FOT-22-32, manufactured by EXFO. The fiber optic cables are 2 meters long and contain a single 62.5/125 optical fiber.

To obtain data, the light detector measures the light transmitted by the each adapter per the test method. These test measurements allow the relative performance of the adapters to be compared. Commercially available adapters of prior designs show an average relative insertion loss of 0.2 dB. The adapters of this invention show an average relative insertion loss of 0.2 dB. Therefore, this adapter of this invention provides equivalent optical performance to the prior designs. In addition, the adapter of this invention provides additional advantages as described above.

EXAMPLE 6

Figure 15A:
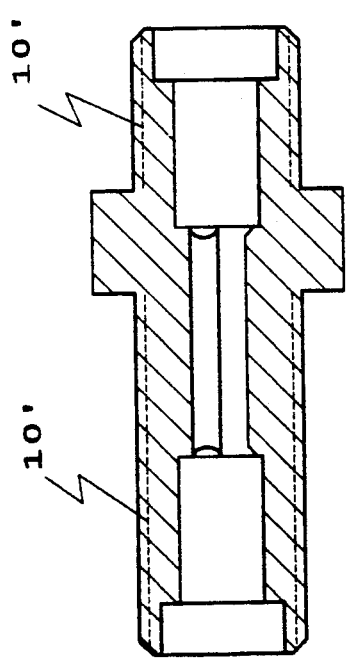
FIG. 15 shows a complete SMA adapter.
Figure 15B:
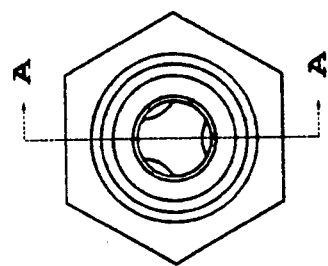

FIG. 15 shows an illustration of a complete SMA adapter constructed according to the invention. This adapter has a three-fluted configuration and a connector retention means 10'.

EXAMPLE 7

Figure 16A:
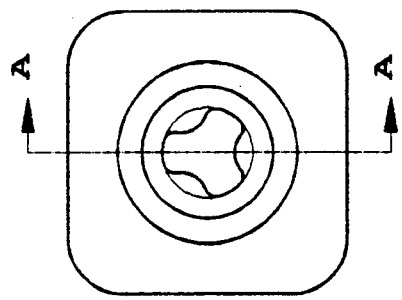
FIG. 16 illustrates a complete FC adapter.
Figure 16B:
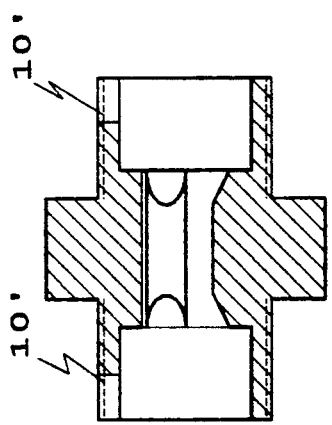

FIG. 16 shows a complete FC adapter incorporating the invention. This adapter has a three-fluted configuration and a connector retention means 10'.

EXAMPLE 8

Figure 17B:
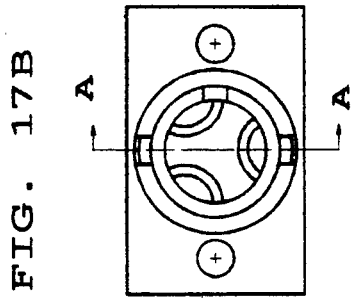
FIG. 17 shows a receptacle incorporating the invention.
Figure 17A:
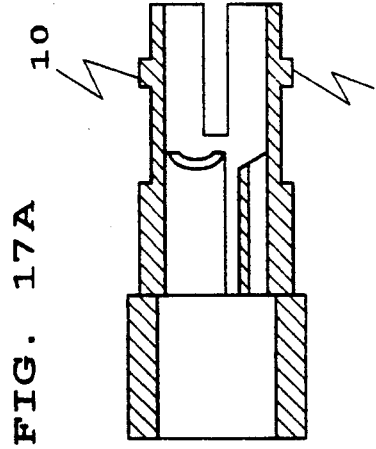
Figure 17C:
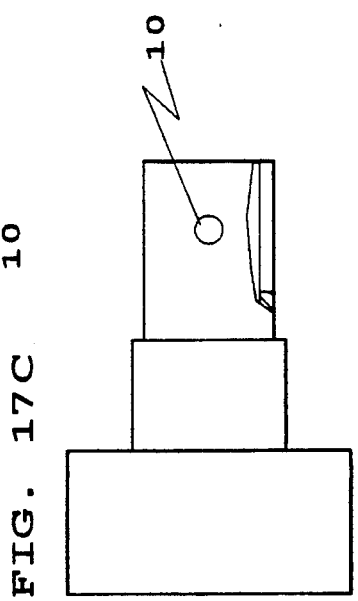

FIG. 17 shows a receptacle incorporating the invention.

Further advantages and modifications of the adapter described herein may suggest themselves to one skilled in the art, all falling within the scope of the invention as defined by the subjoined claims.

We claim:

1. An adapter for coupling a fiber optic connector having a terminus and a securing means for securing said coupling, said adapter being a single piece and having a fluted region within a throat area thereof for aligning said terminus during coupling and a retention means operative with said securing means to retain said connector and said adapter in alignment.

2. An adapter as recited by claim 1, wherein said fluted region comprises an internal passage having at least one flute.

3. An adapter as recited by claim 1, wherein said fluted region comprises two flutes, each of said flutes having a concave region appointed for contact with said terminus.

4. An adapter as recited by claim 1, wherein said fluted region comprises three flutes, each of said flutes having a concave region appointed for contact with said terminus.

5. An adapter as recited by claim 1, wherein said fluted region comprises at least three flutes, each of said flutes having a cross section containing a convex portion appointed for contact with said terminus.

6. An adapter as recited by claim 5, wherein each of said flutes is a curved beam supported at both ends and functions as a leaf spring.

7. An adapter as recited by claim 1, wherein said fluted region comprises at least three flutes, each of said flutes having a cross section containing a substantially planar portion appointed for contact with said terminus.

8. An adapter as recited by claim 1, said adapter being composed of material selected from the group consisting of polymeric material and composite material.

9. An adapter as recited by claim 1, said adapter being composed of liquid crystal polymer.

10. An adapter as recited by claim 2, wherein said flute is an arched bridge.

* * * * *